(12) United States Patent
Chen et al.

(10) Patent No.: US 12,289,208 B2
(45) Date of Patent: Apr. 29, 2025

(54) OPTIMIZATION METHOD AND SYSTEM FOR MINIMIZING NETWORK ENERGY CONSUMPTION BASED ON TRAFFIC GROOMING

(71) Applicant: SOOCHOW UNIVERSITY, Suzhou (CN)

(72) Inventors: Bowen Chen, Suzhou (CN); Yunfei Jiang, Suzhou (CN); Qi Chen, Suzhou (CN); Weike Ma, Suzhou (CN); Ling Liu, Suzhou (CN); Gangxiang Shen, Suzhou (CN); Mingyi Gao, Suzhou (CN); Lian Xiang, Suzhou (CN); Hong Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 450 days.

(21) Appl. No.: 17/802,193

(22) PCT Filed: Aug. 23, 2021

(86) PCT No.: PCT/CN2021/113992
§ 371 (c)(1),
(2) Date: Aug. 25, 2022

(87) PCT Pub. No.: WO2023/019604
PCT Pub. Date: Feb. 23, 2023

(65) Prior Publication Data
US 2023/0308352 A1 Sep. 28, 2023

(30) Foreign Application Priority Data

Aug. 16, 2021 (CN) .......................... 202110938102.8

(51) Int. Cl.
*H04L 41/0833* (2022.01)
*H04L 45/122* (2022.01)
(52) U.S. Cl.
CPC ........ *H04L 41/0833* (2013.01); *H04L 45/122* (2013.01)
(58) Field of Classification Search
CPC .......................... H04L 41/0833; H04L 45/122; H04L 41/5051
See application file for complete search history.

(56) References Cited

U.S. PATENT DOCUMENTS

| 2012/0269510 A1* | 10/2012 | Hui ...................... H04J 14/0257 398/79 |
| 2013/0195452 A1* | 8/2013 | Hui ...................... H04Q 11/0005 398/50 |
| 2014/0099119 A1 | 4/2014 | Wei et al. |

FOREIGN PATENT DOCUMENTS

| CN | 104092609 A | 10/2014 |
| CN | 109245918 A | 1/2019 |
| CN | 110234128 A | 9/2019 |

OTHER PUBLICATIONS

Yongli Zhao et al., "Energy Efficiency With Sliceable Multi-Flow Transponders and Elastic Regenerators in Survivable Virtual Optical Networks" IEEE Transactions on Communications, vol. 64, No. 6, Jun. 2016, 2539-2550 (Jun. 30, 2016).

* cited by examiner

*Primary Examiner* — Zhensheng Zhang
(74) *Attorney, Agent, or Firm* — SZDC Law PC

(57) ABSTRACT

The present invention provides an optimization method and system for minimizing network energy consumption based on traffic grooming. The method includes: generating a set of service requests in an elastic optical network, and calculating a reachable node set of shortest paths from source to destination nodes for each service request; establishing a virtual reachable path in the reachable node set of shortest paths; and establishing a target function of an integer linear programming model of the minimizing network energy consumption, and sequentially determining whether a bandwidth capacity constraint of a single spectrum slot, a path uniqueness constraint, a spectrum allocation constraint, and an optical regenerator quantity constraint are satisfied, where if all constraints are satisfied, the service request is successfully established, or if any of the constraints is not satisfied, the service request fails to be established. The present invention helps to improve the energy efficiency of service requests.

10 Claims, 3 Drawing Sheets

OPTIMIZATION METHOD AND SYSTEM FOR MINIMIZING NETWORK ENERGY CONSUMPTION BASED ON TRAFFIC GROOMING

This application is the National Stage Application of PCT/CN2021/113992, filed on Aug. 23, 2021, which claims priority to Chinese Patent Application No. 202110938102.8, filed on Aug. 16, 2021, which is incorporated by reference for all purposes as if fully set forth herein.

FIELD OF THE INVENTION

The present invention relates to the technical field of energy consumption optimization, and in particular, to an optimization method and system for minimizing network energy consumption based on traffic grooming.

DESCRIPTION OF THE RELATED ART

With the rapid growth of the network bandwidth and the number of mobile users as well as the emergence of different application services such as cloud computing, data centers, and video on demand, data traffic in networks has entered an explosive growth phase, causing great difficulties and challenges to the basic network transmission. Therefore, how to improve the bandwidth resource efficiency of networks and how to ensure the energy consumption efficiency of networks become technical challenges for research. A fixed spectrum width is generally used in a conventional optical network, which makes it impossible to effectively use bandwidth resources, resulting in low efficiency, poor flexibility, and serious waste. The flexible allocation of bandwidth resources can be implemented by adopting flexible spectrum slicing, thereby improving the utilization of spectrum resources. To increase and improve the flexibility of network bandwidth resource allocation as well as to improve the energy consumption efficiency of networks and reduce the use of network energy consuming components, the traffic grooming technology in IP over elastic optical networks is used to solve this problem. However, although the traffic grooming technology in IP over elastic optical networks solves the problem of serious waste of bandwidth resources in optical channels, an optimal allocation method has not yet been reached in the process of resource allocation, and the number of optical energy consuming components cannot be minimized. As a result, the aspects of bandwidth allocation and energy consumption in traffic grooming still face significant challenges.

The traffic grooming technology is how to aggregate multiple low-speed service flows of different types and different rates into high-speed data flows for data transmission in the same optical channel. A traffic grooming method is considered as an effective method for optimizing the allocation of spectrum resources in optical networks and reducing the use of power components in optical networks. Therefore, the method has wide application value in optical networks. However, in a conventional traffic grooming method, the procedure of resource allocation is solidified, and bandwidth resources in optical channels often fail to be appropriately utilized, resulting in an increase in the number of optical energy consuming components used in elastic optical networks. Therefore, the problem of routing and spectrum resource allocation based on traffic grooming is one of the key issues to optimize the energy consumption of networks and improve the efficiency of spectrum resources in networks. In one aspect, in a conventional IP over elastic optical network, since one optical channel can only carry the same service request, there is no need to consider the remaining available spectrum resources in the optical channel, and only simple routing and spectrum resource allocation need to be considered to meet the spectrum continuity in spectrum allocation. In another aspect, in elastic optical networks, for the full utilization of available spectrum resources in optical channels, the routing and spectrum allocation need to be considered, and it is necessary to groom different service requests into the same optical channel simultaneously in the process of spectrum allocation to achieve improved spectrum resource efficiency and energy consumption efficiency, resulting in complexity in network resource allocation.

SUMMARY OF THE INVENTION

For this, a technical problem to be resolved by the present invention is to overcome problems in the prior art that the quality of service of each service request in the transmission in an elastic optical network needs to be improved and the energy consumption of the network is high, and the present invention provides an optimization method and system for minimizing network energy consumption based on traffic grooming that can improve the quality of service of each service request in the transmission in an elastic optical network, fully utilize spectrum resources in the network, and reduce the energy consumption of the network.

To resolve the foregoing technical problems, an optimization method for minimizing network energy consumption based on traffic grooming of the present invention includes: generating a group of service request sets in an elastic optical network, and calculating a reachable node set in a plurality of shortest paths according to a source node and a destination node of each service request; establishing a virtual reachable path between a source node and a destination node in the reachable node set in the plurality of shortest paths; and establishing a target function of an integer linear programming model of minimizing network energy consumption based on the virtual reachable path, and sequentially determining whether a bandwidth capacity constraint of a single spectrum slot, a path uniqueness constraint, a spectrum allocation constraint, and an optical regenerator quantity constraint are satisfied in a process of allocating a resource to each service request, where if all the constraints are satisfied, the service request is successfully established, or if any of the constraints is not satisfied, the service request fails to be established.

In an embodiment of the present invention, when the virtual reachable path is established between the source node and the destination node, a distance between any two nodes on a working path does not exceed a maximum transmission distance of light.

In an embodiment of the present invention, energy consumers in the elastic optical network include an IP router port, an optical transponder, and an optical regenerator.

In an embodiment of the present invention, the target function includes calculating a quantity of optical channels in the network and total energy consumption corresponding to IP router ports and optical transponders and calculating a quantity of optical regenerators configured in the network and total energy consumption corresponding to the optical regenerators.

In an embodiment of the present invention, the bandwidth capacity constraint of the single spectrum slot is $\Sigma_{(s,d) \in CR} \Sigma_{k \in K} X_{l,w}^{(s,d),k} \leq C \times Y_w^l$, $w \in W$, $\forall l \in L$, where CR represents the group of service request sets, K represents a set of calculated k shortest paths, C is a bandwidth capacity of each spectrum slot, L and W respectively represent an optical fiber link set in the optical network and a spectrum slot set on each link, $X_{l,w}^{(s,d),k}$ is a variable, and if a service request (s, d) occupies a spectrum slot w on a link l in a $k^{th}$ shortest path, a value of the variable is an amount of occupied bandwidth resources, or otherwise the value is 0.

In an embodiment of the present invention, the path selection uniqueness constraint is $\Sigma_{k \in K} K_k^{(s,d)} = 1 \forall (s, d) \in CR$, where $K_k^{(s,d)}$ is a binary variable, and if a service request (s, d) uses a $k^{th}$ shortest path to complete service transmission, a value of the variable is 1, or otherwise the value is 0.

In an embodiment of the present invention, the spectrum allocation constraint is: $\Sigma_{w \in W} X_{l,w}^{(s,d),k} = B_{sd} \times K_k^{(s,d)} \forall l \in X_k^{(s,d)}$, (s, d) $\in$ CR, k $\in$ K, $X_{l_i,w}^{(s,d),k} = X_{l_j,w}^{(s,d),k} \forall l_i, l_j \in X_k^{(s,d)}$, $l_i \neq l_j$, $K_k^{(s,d)} = 1$, w $\in$ W, (s, d) $\in$ CR, k $\in$ K, where $B_{sd}$ represents a bandwidth requirement of the service, $X_k^{(s,d)}$ represents a set of link occupation status of a service request (s, d) on a $k^{th}$ shortest path, and $X_{l_i,w}^{(s,d),k}$ ($X_{l_j,w}^{(s,d),k}$) represents a variable, and if the service request (s, d) occupies a spectrum slot w on a link $l_i$ ($l_j$) in the $k^{th}$ shortest path, a value of the variable is an amount of occupied bandwidth resources, or otherwise the value is 0.

In an embodiment of the present invention, the optical regenerator quantity constraint is:

$$Z_i < M \ \forall \ i \in N; \ \sum_{j=1}^{|N|} x_{k,s,j}^{(s,d)} - \sum_{j=1}^{|N|} x_{k,j,s}^{(s,d)} = K_k^{(s,d)} \ \forall \ (s, d) \in CR, k \in K;$$

$$\sum_{j=1}^{|N|} x_{k,j,d}^{(s,d)} - \sum_{j=1}^{|N|} x_{k,d,j}^{(s,d)} = K_k^{(s,d)} \ \forall \ (s, d) \in CR, k \in K;$$

$$\sum_{i=1}^{|N|} x_{k,j,i}^{(s,d)} = \sum_{i=1}^{|N|} x_{k,i,j}^{(s,d)} = K_k^{(s,d)} \ \forall \ (s, d) \in CR, k \in K, j \in K, j \neq s, d;$$

$$x_{k,i,j}^{(s,d)} \leq r_{k,i,j}^{(s,d)} \ \forall \ (s, d) \in CR, k \in K, i \in N, j \in N;$$

$$y_{k,i}^{(s,d)} \geq x_{k,i,j}^{(s,d)} \ \forall \ (s, d) \in CR, k \in K, i \in N, i \neq s, j \in N;$$

$$Z_i \geq \frac{\sum_{(s,d) \in CR} \sum_{k \in K} y_{k,i}^{(s,d)} \times B_{sd}}{VL} \ \forall \ i \in N,$$

where $Z_i$ represents a total quantity of configured optical regenerators on a node i; values of M and VL respectively represent a relatively large integer and a maximum bandwidth requirement that an optical regenerator is allowed to carry; $x_{k,i,j}^{(s,d)}$ is a binary variable, and if a service request (s, d) occupies a reachable path (i, j) on a $k^{th}$ shortest path, a value of the variable is 1, or otherwise the value is 0; $y_{k,i}^{(s,d)}$ is a binary variable, and if the service request (s, d) arranges an optical regenerator on a node i of the $k^{th}$ shortest path, a value of the variable is 1, or otherwise the value is 0; and $B_{sd}$ represents a bandwidth requirement of the service.

In an embodiment of the present invention, the service request is successfully established, and corresponding spectrum resources are allocated to the service request.

The present invention further provides an optimization system for minimizing network energy consumption based on traffic grooming, including: a calculation module, configured to generate a group of service request sets in an elastic optical network, and calculate a reachable node set in a plurality of shortest paths according to a source node and a destination node of each service request; an establishment module, configured to establish a virtual reachable path between a source node and a destination node in the reachable node set in the plurality of shortest paths; and a determination module, configured to: establish a target function of an integer linear programming model of minimizing network energy consumption based on the virtual reachable path, and sequentially determine whether a bandwidth capacity constraint of a single spectrum slot, a path uniqueness constraint, a spectrum allocation constraint, and an optical regenerator quantity constraint are satisfied in a process of allocating a resource to each service request, where if all the constraints are satisfied, the service request is successfully established, or if any of the constraints is not satisfied, the service request fails to be established.

Compared with the prior art, the foregoing technical solution of the present invention has the following advantages:

For the optimization method and system for minimizing network energy consumption based on traffic grooming in the present invention, to resolve the problem of energy consumption efficiency in an IP over elastic optical network, the present invention provides an integer linear programming method based on the energy calculation in a static network, that is, implements the optimization with the objective of minimizing network energy consumption in a static network. In an IP over elastic optical network, the method for minimizing network energy consumption based on traffic grooming in the present invention can greatly reduce energy consumption generated to complete service requests, so that the problem of energy consumption efficiency in the network is resolved, thereby improving the transmission performance and quality of service of service requests in the IP over elastic optical network. In addition, the number of optical regenerators used in the network can be minimized, thereby further improving the energy consumption utilization efficiency of network service transmission.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

Embodiment 1

Figure 1:
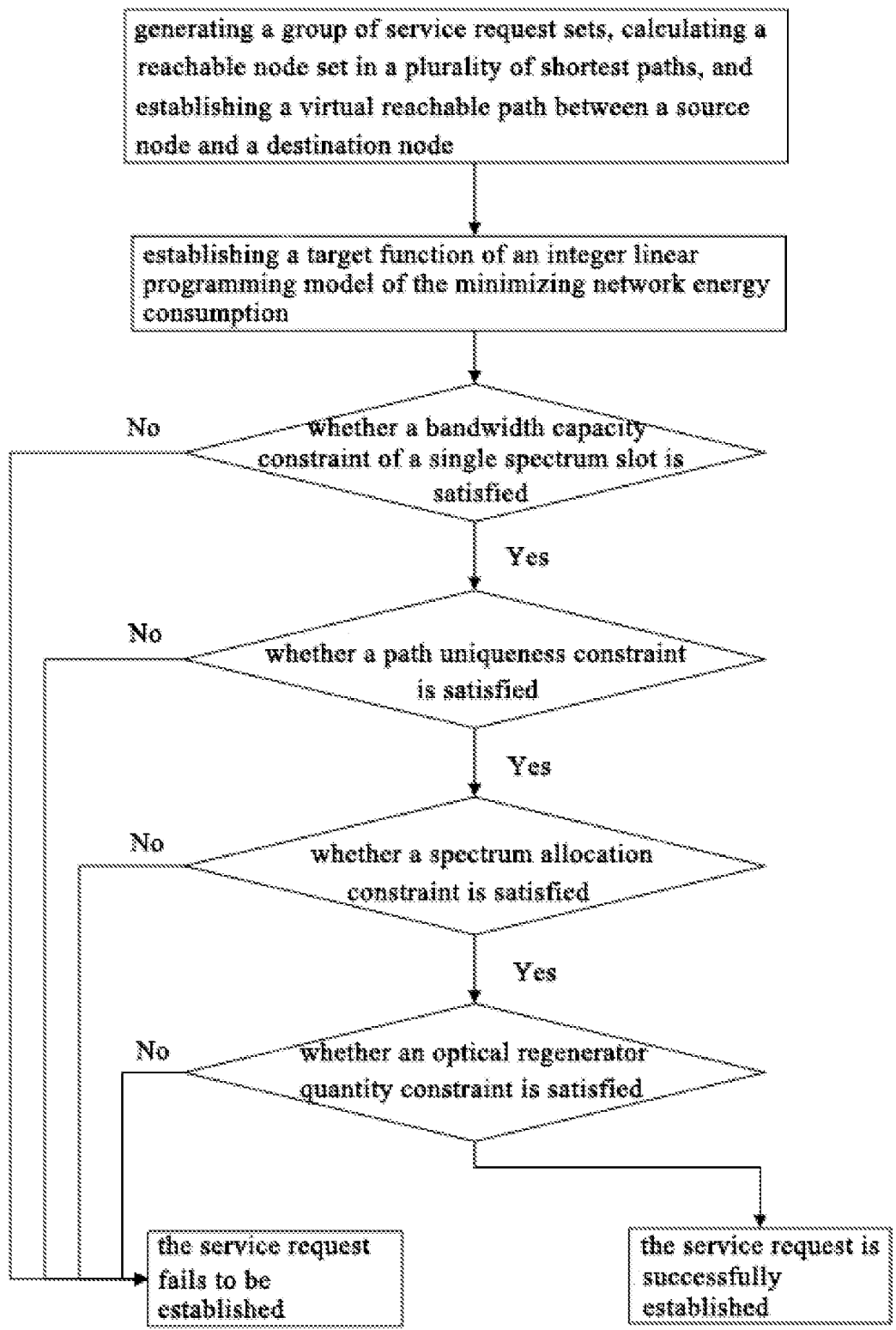
FIG. 1 is a flowchart of an optimization method for minimizing network energy consumption based on traffic grooming according to the present invention.

As shown in FIG. 1, this embodiment provides an optimization method for minimizing network energy consumption based on traffic grooming, including: step S1: generating a group of service request sets in an elastic optical network, and calculating a reachable node set in a plurality of shortest paths according to a source node and a destination node of each service request; step S2: establishing a virtual reachable path between a source node and a destination node in the reachable node set in the plurality of shortest paths; and step S3: establishing a target function of an integer linear programming model of minimizing network energy consumption based on the virtual reachable path, and sequentially determining whether a bandwidth capacity constraint of a single spectrum slot, a path uniqueness constraint, a spectrum allocation constraint, and an optical regenerator quantity constraint are satisfied in a process of allocating a resource to each service request, where if all the constraints are satisfied, the service request is successfully established, or if any of the constraints is not satisfied, the service request fails to be established.

In the optimization method for minimizing network energy consumption based on traffic grooming in this embodiment, in step S1, a group of service request sets are generated in an elastic optical network, and a reachable node set in a plurality of shortest paths is calculated according to a source node and a destination node of each service request, to facilitate the establishment of a virtual reachable path. In step S2, a virtual reachable path is established between a source node and a destination node in the reachable node set in the plurality of shortest paths, which helps to implement the optimization with the objective of minimizing network energy consumption in a static network. In step S3, a target function of an integer linear programming model of minimizing network energy consumption is established based on the virtual reachable path, and it is sequentially determined whether a bandwidth capacity constraint of a single spectrum slot, a path uniqueness constraint, a spectrum allocation constraint, and an optical regenerator quantity constraint are satisfied in a process of allocating a resource to each service request, where if all the constraints are satisfied, the service request is successfully established, so that corresponding spectrum resources are allocated to the service request, or if any of the constraints is not satisfied, the service request fails to be established. The entire process helps to improve the quality of service of each service request in the transmission in the elastic optical network, fully utilize spectrum resources in the network, and perform traffic grooming on the service requests to reduce the number of optical channels in the network.

In an IP over static network model, after occupying corresponding spectrum resources, a service request does not release these resources. Therefore, the total energy consumption of the network is a sum of the powers of all network power consumption components. Therefore, the total energy consumption of each service request may be calculated as follows:

$$E=P\times t=(N_I\times P_I+N_T\times P_T+N_R\times P_R)\times t \quad (1),$$

where E and P respectively represent a total energy consumption and a total network power consumption of the service request within a unit time, and t represents the unit time in seconds; and $N_I$, $N_T$, and $N_R$ respectively represent a quantity of IP router ports, a quantity of optical transponders, and a quantity of optical regenerators, and $P_I$, $P_T$, and $P_R$ respectively represent a power of the IP router port, a power of the optical transponder, and a power of the optical regenerator.

For the problem of energy consumption in the IP over elastic optical network, the integer linear programming model is an optimal method for resolving the problem. In the IP over elastic optical network, a topological structure of the network, the length of each link, the occupation status of spectrum resources, and a quantity and bandwidth requirements of IP service requests are given. Sufficient network spectrum resources are given to ensure that data transmission can be performed over the network for all IP services. The objective of the optimization is to minimize the energy consumption in the network, that is, reduce the quantity of IP router ports, the quantity of optical transponders, and the quantity of optical regenerators as much as possible, thereby establishing a traffic grooming-based integer linear programming model (ILP_RP) configured with a minimized quantity of optical regenerators.

In step S1, in an IP over elastic optical network G (N, L, W), a group CR of service request sets are generated, and each service request (s, d, $B_{sd}$)∈CR, where N, L, and W respectively represent an optical switching node set in the optical network, an optical fiber link set, and a spectrum slot set on each link in the optical network; and s and d respectively represent a source node and a destination node of each service request, and $B_{sd}$ represents a bandwidth requirement of the service. K represents a set of k shortest paths calculated by using a KSP algorithm. The values of |N|, |L|, and |W| are set, which respectively represent a quantity of nodes in the network, a quantity of spectrum slots on each link, and a bandwidth capacity of each spectrum slot; the values of $P_I$, $P_T$, $P_R$, M, VL are set, which respectively represent the power of the IP router port, the power of the optical transponder, and the power of the optical regenerator, a relatively large integer, and a maximum bandwidth requirement that an optical regenerator is allowed to carry. $X_k^{(s,d)}$ represents a set of link occupation status of a service request (s, d) on a $k^{th}$ shortest path.

The integer linear programming model with the minimized network energy consumption has an input variable $r_{k,i,j}^{(s,d)}$, representing a node reachable status in a $k^{th}$ shortest path of a service request (a source node s and a destination node d).

Figure 2A:
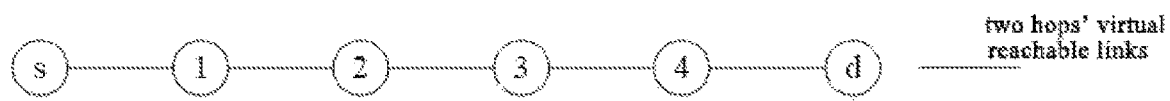
FIG. 2a is a schematic diagram of a given path according to the present invention.
Figure 2B:
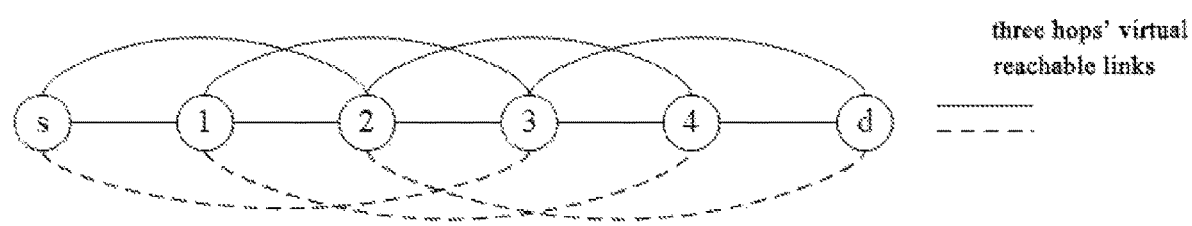
FIG. 2b is a schematic diagram of a reachable path according to the present invention.

In step S2, when the virtual reachable path is established between the source node and the destination node, a distance between any two nodes on a working path does not exceed a maximum transmission distance of light. In the diagram of a given path in FIG. 2a, if the distance between any two nodes i and j on a working path does not exceed the maximum transmission distance of light, a virtual reachable path is established between the two nodes. FIG. 2b gives respective virtual reachable links in cases that the maximum transmission distance of light is two hops and three hops. It is assumed that the maximum transmission distance of light is three hops. As can be known from the figure, there is reachability between the node s and nodes 1, 2, and 3. The values of $r_{k,s,1}^{(s,d)}$, $r_{k,s,2}^{(s,d)}$, and $r_{k,s,3}^{(s,d)}$ are all 1. The values of $r_{k,s,4}^{(s,d)}$ and $r_{k,s,d}^{(s,d)}$ are 0.

In step S3, because the present invention mainly resolves the problem of energy consumption of energy consumption components in the IP over elastic optical network. An optimized target function minimizes the energy consumption in the IP over elastic optical network. The target function of the integer linear programming model is mainly used for optimizing the network energy consumption in the IP over elastic optical network. The optimized target function may be represented by using the following formula:

$$\text{minimize: } 2\times\Sigma_{l\in L}\Sigma_{w\in W}Y_w^l\times(P_I+P_T)\times\Sigma_{i\in N}Z_i\times P_R\times t \quad (2).$$

The energy consumers in the IP over elastic optical network mainly include an IP router port, an optical transponder, and an optical regenerator. $Y_w^l$ represents whether a spectrum slot w on a link l is occupied by a service request or some service requests, and $Z_i$ represents a total quantity of configured optical regenerators on a node i. The target function is mainly formed by two parts. The first part represents calculating a quantity of optical channels in the network and total energy consumption corresponding to IP router ports and optical transponders. The second part represents a quantity of regenerators configured in the network and total energy consumption corresponding to the optical regenerators. The values of $P_I$, $P_T$, and $P_R$ respectively represent the power of the IP router port, the power of the optical transponder, and the power of the optical regenerator. N, L, and W respectively represent an optical switching node set in the optical network, an optical fiber link set, and a spectrum slot set on each link in the optical network. t represents the unit time in seconds.

During the allocation and optimization of spectrum resources in the IP over elastic optical network, the following constraints need to be satisfied, specifically:

the bandwidth capacity constraint of the single spectrum slot is:

$$\Sigma_{(s,d) \in CR} \Sigma_{k \in K} X_{l,w}^{(s,d)} \leq C \times Y_w^l, w \in W, \forall l \in L \quad (3),$$

where CR represents the group of service request sets, K represents a set of calculated k shortest paths, C is a bandwidth capacity of each spectrum slot, L and W respectively represent an optical fiber link set in the optical network and a spectrum slot set on each link, $X_{l,w}^{(s,d),k}$ is a variable, and if a service request (s, d) occupies a spectrum slot w on a link l in a $k^{th}$ shortest path, a value of the variable is an amount of occupied bandwidth resources, or otherwise the value is 0. In addition, K represents a set of k shortest paths calculated by using a KSP algorithm. In this case, the constraint ensures that a sum of spectrum resources occupied by all service requests in a spectrum slot of a link does not exceed a bandwidth carrying capability of the spectrum slot.

The path selection uniqueness constraint is:

$$\Sigma_{k \in K} K_k^{(s,d)} = 1 \forall (s,d) \in CR \quad (4),$$

where $K_k^{(s,d)}$ is a binary variable, and if a service request (s, d) uses a $k^{th}$ shortest path to complete service transmission, a value of the variable is 1, or otherwise the value is 0. In this case, the constraint ensures that one shortest path is selected for each service request to allocate spectrum resources, to satisfy bandwidth resources of each service request.

The spectrum allocation constraint is:

$$\Sigma_{w \in W} X_{l,w}^{(s,d),k} = B_{sd} \times K_k^{(s,d)} \forall l \in X_k^{(s,d)}, (s,d) \in CR, k \in K \quad (5),$$

$$X_{l_i,w}^{(s,d),k} = X_{l_j,w}^{(s,d),k} \forall l_i, l_j \in X_k^{(s,d)}, l_i \neq l_j, K_k^{(s,d)} = 1, w \in W, (s,d) \in CR, k \in K \quad (6),$$

where $B_{sd}$ represents a bandwidth requirement of the service, $X_k^{(s,d)}$ represents a set of link occupation status of a service request (s, d) on a $k^{th}$ shortest path, and $X_{l_i,w}^{(s,d),k}$ ($X_{l_j,w}^{(s,d),k}$) represents a variable, and if the service request (s, d) occupies a spectrum slot w on a link $l_i$ ($l_j$) in the $k^{th}$ shortest path, a value of the variable is an amount of occupied bandwidth resources, or otherwise the value is 0. In this case, the constraint (5) ensures that each service request occupies required bandwidth resources on a corresponding working path, and the constraint (6) is a constraint ensuring spectrum continuity, that is, ensuring that spectrum slots occupied on links on the working path have the same sequence number.

The optical regenerator quantity constraint is:

$$Z_i < M \; \forall \; i \in N, \quad (7)$$

$$\sum_{j=1}^{|N|} x_{k,s,j}^{(s,d)} - \sum_{j=1}^{|N|} x_{k,j,s}^{(s,d)} = K_k^{(s,d)} \; \forall \; (s,d) \in CR, k \in K, \quad (8)$$

$$\sum_{j=1}^{|N|} x_{k,j,d}^{(s,d)} - \sum_{j=1}^{|N|} x_{k,d,j}^{(s,d)} = K_k^{(s,d)} \; \forall \; (s,d) \in CR, k \in K, \quad (9)$$

$$\sum_{i=1}^{|N|} x_{k,j,d}^{(s,d)} = \sum_{i=1}^{|N|} x_{k,d,j}^{(s,d)} = K_k^{(s,d)} \; \forall \; (s,d) \in CR, k \in K, j \in K, j \neq s, d, \quad (10)$$

$$x_{k,i,j}^{(s,d)} \leq r_{k,i,j}^{(s,d)} \; \forall \; (s,d) \in CR, k \in K, i \in N, j \in N, \quad (11)$$

$$y_{k,i}^{(s,d)} \geq x_{k,i,j}^{(s,d)} \; \forall \; (s,d) \in CR, k \in K, i \in N, i \neq s, j \in N, \quad (12)$$

$$Z_i \geq \frac{\sum_{(s,d) \in CR} \sum_{k \in K} y_{k,i}^{(s,d)} \times B_{sd}}{VL} \; \forall \; i \in N, \quad (13)$$

where $Z_i$ represents a total quantity of configured optical regenerators on a node i; values of M and VL respectively represent a relatively large integer and a maximum bandwidth, requirement that an optical regenerator is allowed to carry; $x_{k,i,j}^{(s,d)}$ is a binary variable, and if a service request (s, d) occupies a reachable path (i, j) on a $k^{th}$ shortest path, a value of the variable, is 1, or otherwise the value is 0; $y_{k,i}^{(s,d)}$ is a binary variable, and if the service request (s, d) arranges an optical regenerator on a node i of the $k^{th}$ shortest path, a value of the variable is 1, or otherwise the value is 0; and $B_{sd}$ represents a bandwidth requirement of the service. The constraint (7) ensures that a quantity of regenerators on each node is subject to a particular limitation. The constraints (8) to (10) ensure a traffic constraint. The constraint (8) ensures that when a service request of a source node s and a destination node d enters the network, traffic of an optical regenerator is generated on a corresponding reachable path of the source node. Meanwhile, the constraint (9) ensures that the generated traffic is terminated at the destination node d on the corresponding reachable path. The constraint (10) ensures that for any intermediate node, the volume of incoming traffic is equal to that of outgoing traffic. The constraint (11) ensures that for a $k^{th}$ shortest path of the service request from s to d, according to a known reachable path, a corresponding optical regenerator is placed on an intermediate node between the source node s and the destination node d, to ensure the reachability between s and d. The constraint (12) ensures that for the $k^{th}$ shortest path of the service request (s to d), an optical regenerator is arranged for all reachable paths (excluding a source end) of the $k^{th}$ shortest path. The constraint (13) ensures a quantity of optical regenerators eventually placed on each node.

Based on the foregoing constraints, the optimization method for minimizing network energy consumption based on traffic grooming in an IP over elastic optical network can be found, to implement the optimized target function of the integer linear programming of the present invention.

Specific implementations in the present invention are described below in detail with reference to related examples.

Figure 3:
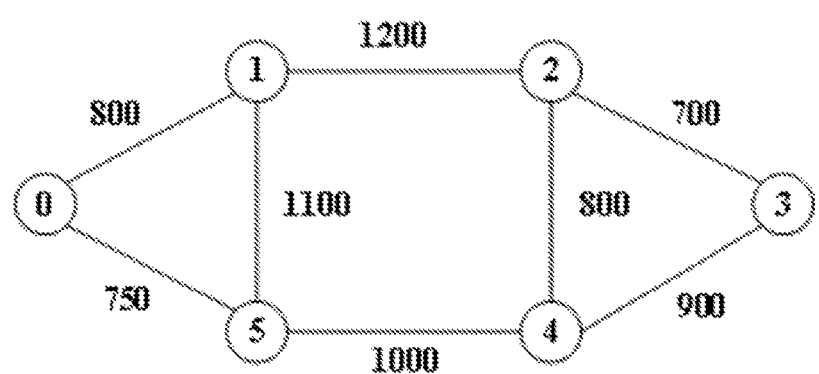
FIG. 3 is a schematic diagram of a topological graph of a six-node network according to the present invention.
Figure 4:
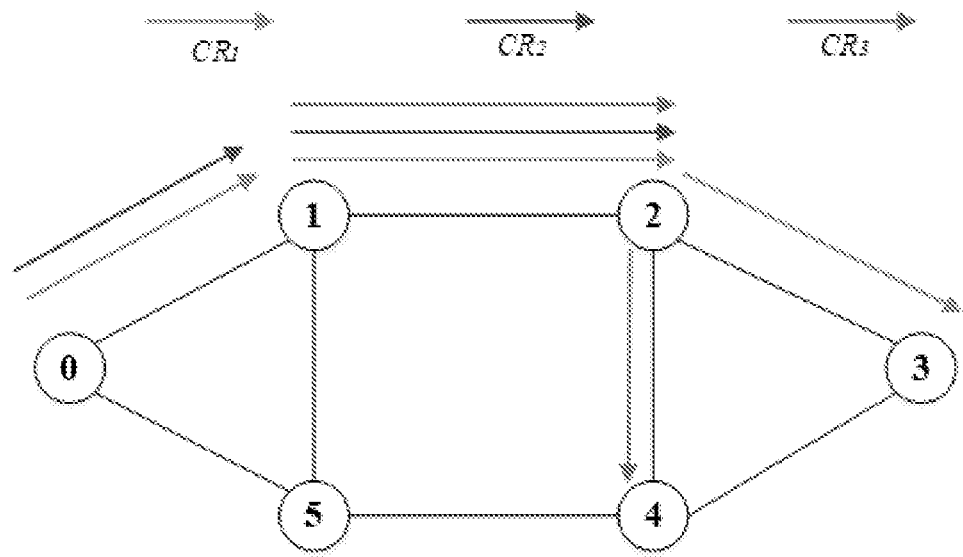
FIG. 4 is a schematic diagram of a service routing distribution status in a network according to the present invention.

A network topology shown in FIG. 3 is used as an example. A value on an optical fiber link represents a link length (unit: km). Each optical fiber link is bidirectional. It is set that each optical fiber link has five spectrum slots. The bandwidth capacity of each spectrum slot is 100 Gbps.

A set of service requests $CR \in \{CR_1(0, 3, 40), CR_2(0, 2, 120), CR_3(1, 4, 40)\}$ are generated in the IP over elastic optical network.

The target function $2 \times \Sigma_{l \in L} \Sigma_{w \in W} Y_w^l \times (P_I + P_T) \times t + \Sigma_{i \in N} Z_i \times P_R \times t$ (see Formula (2)) of the integer linear programming model based on the minimizing network energy consumption proposed in the present invention is established and executed.

Different constraints in the optimization method for minimizing network energy consumption based on traffic grooming in the IP over elastic optical network are established and executed. In a process of allocating a resource to each service request, the bandwidth capacity constraint of the single spectrum slot (see Formula (3)), the path uniqueness constraint (see Formula (4)), the spectrum allocation constraint (see Formulas (5) and (6)), and the optical regenerator quantity constraint (see Formulas (7) to (13)) need to be satisfied.

Figure 5:
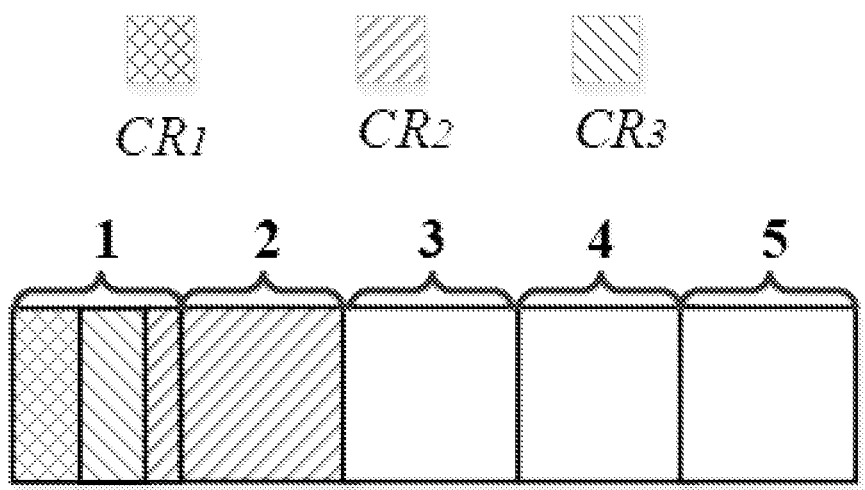
FIG. 5 is a schematic diagram of a traffic grooming status of an optical fiber link according to the present invention.

Through the foregoing steps, corresponding spectrum resources may be allocated to service requests $CR_1(0, 3, 40)$, $CR_2(0, 2, 120)$, and $CR_3(1, 4, 40)$ in the network based on target conditions. To reduce spectrum occupation, in the method of the present invention, during a search for a working path for each service, k shortest paths are calculated for each service as candidate paths for the service. It is set that K=2. As can be known from FIG. 3, k shortest paths of $CR_1(0, 3, 40)$ are 0-5-4-3 and 0-1-2-3; k shortest paths of $CR_2(0, 2, 120)$ are 0-1-2 and 0-5-4-2; and k shortest paths of $CR_3(1, 4, 40)$ are 1-2-4 and 1-5-4. Because candidate paths of the three service requests pass through the link 0-1 and the link 1-2 repeatedly, during the selection of a working path, traffic grooming is performed as much as possible on the two links. In the method of the present invention, after the constraints are executed, optimal resources are allocated to the three service requests in the network, thereby minimizing network energy consumption. As shown in FIG. 4, 0-1-2-3 is first selected as a working path for $CR_1(0, 3, 40)$, and a corresponding spectrum resource is allocated to the service request. Next, 0-1-2 is selected as a working path for $CR_2(0, 2, 120)$. A partial bandwidth requirement of 20 Gbps is groomed into the remaining spectrum space in the spectrum slots 1 of the links 0-1 and 1-2, and a new optical channel is established for the bandwidth requirement of 100 Gbps. Finally, 1-2-4 is selected as a working path for $CR_3(1, 4, 40)$. Traffic grooming is performed in the spectrum slot 1 of the link 1-2, and a new optical channel is established on the link 2-4. FIG. 5 shows the occupation status of spectrum resources in the link 1-2. Partial bandwidth requirements of $CR_1(0, 3, 40)$, $CR_2(0, 2, 120)$, and $CR_3(1, 4, 40)$ are groomed into the spectrum slot 1, and one spectrum slot is separately occupied for $CR_2(0, 2, 120)$. It is set that the maximum transmission distance of light of the optical regenerator is 2000 km, and it is only necessary to arrange one optical regenerator for the service request $CR_1(0, 3, 40)$ on a node 2 to restore an optical signal. In this case, optimal spectrum resources are allocated to one group of service requests $CR_1(0, 3, 40)$, $CR_2(0, 2, 120)$, and $CR_3(1, 4, 40)$, and the fewest IP router ports, optical transponders, and optical regenerators are required, thereby minimizing the energy consumption of the IP over elastic optical network.

Embodiment 2

Based on the same inventive concept, this embodiment provides an optimization system for minimizing network energy consumption based on traffic grooming. The principle of solving the problems is similar to that of the optimization method for minimizing network energy consumption based on traffic grooming. Details are not repeated.

Embodiments provide an optimization system for minimizing network energy consumption based on traffic grooming, including:
  a calculation module, configured to generate a group of service request sets in an elastic optical network, and calculate a reachable node set in a plurality of shortest paths according to a source node and a destination node of each service request;
  an establishment module, configured to establish a virtual reachable path between a source node and a destination node in the reachable node set in the plurality of shortest paths; and
  a determination module, configured to: establish a target function of an integer linear programming model of the minimizing network energy consumption based on the virtual reachable path, and sequentially determine whether a bandwidth capacity constraint of a single spectrum slot, a path uniqueness constraint, a spectrum allocation constraint, and an optical regenerator quantity constraint are satisfied in a process of allocating a resource to each service request, where if all the constraints are satisfied, the service request is successfully established, or if any of the constraints is not satisfied, the service request fails to be established.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. An optimization method for minimizing network energy consumption based on traffic grooming, comprising steps of:
    step S1: generating a group of service request sets in an elastic optical network, and calculating a reachable node set in a plurality of shortest paths according to a source node and a destination node of each service request;
    step S2: establishing a virtual reachable path between a source node and a destination node in the reachable node set in the plurality of shortest paths; and
    step S3: establishing a target function of an integer linear programming model of the minimizing network energy consumption based on the virtual reachable path, and sequentially determining whether a bandwidth capacity constraint of a single spectrum slot, a path uniqueness constraint, a spectrum allocation constraint, and an optical regenerator quantity constraint are satisfied in a process of allocating a resource to each service request, wherein if all the constraints are satisfied, the service request is successfully established, or if any of the constraints is not satisfied, the service request fails to be established.

2. The optimization method for minimizing network energy consumption based on traffic grooming according to claim 1, wherein when the virtual reachable path is established between the source node and the destination node, a distance between any two nodes on a working path does not exceed a maximum transmission distance of light.

3. The optimization method for minimizing network energy consumption based on traffic grooming according to claim 1, wherein energy consumers in the elastic optical network comprise an IP router port, an optical transponder, and an optical regenerator.

4. The optimization method for minimizing network energy consumption based on traffic grooming according to claim 1, wherein the target function comprises calculating a quantity of optical channels in the network and total energy consumption corresponding to IP router ports and optical transponders and calculating a quantity of optical regenerators configured in the network and total energy consumption corresponding to the optical regenerators.

5. The optimization method for minimizing network energy consumption based on traffic grooming according to claim 1, wherein the bandwidth capacity constraint of the single spectrum slot is $\Sigma_{(s,d)\in CR}\Sigma_{k\in K}X_{l,w}^{(s,d),k} \leq C \times Y_{w}^{l} \forall l \in L$, $w \in W$, wherein CR represents the group of service request sets, K represents a set of calculated k shortest paths, C is a bandwidth capacity of each spectrum slot, L and W respectively represent an optical fiber link set in the optical network and a spectrum slot set on each link, $X_{l,w}^{(s,d),k}$ is a variable, and if a service request (s, d) occupies a spectrum slot w on a link l in a $k^{th}$ shortest path, a value of the variable is an amount of occupied bandwidth resources, or otherwise the value is 0.

6. The optimization method for minimizing network energy consumption based on traffic grooming according to claim 1, wherein the path selection uniqueness constraint is $\Sigma_{k\in K}K_k^{(s,d)}=1 \forall (s,d) \in CR$, wherein $K_k^{(s,d)}$ is a binary variable, and if a service request (s, d) uses a $k^{th}$ shortest path to complete service transmission, a value of the variable is 1, or otherwise the value is 0.

7. The optimization method for minimizing network energy consumption based on traffic grooming according to claim 1, wherein the spectrum allocation constraint condition is:

$$\Sigma_{w\in W}X_{l,w}^{(s,d),k}=B_{sd}\times K_k^{(s,d)} \forall l \in X_k^{(s,d)}, (s,d) \in CR, k \in K,$$

$$X_{l_i,w}^{(s,d),k}=X_{l_j,w}^{(s,d),k} \forall l_i, l_j \in X_k^{(s,d)}, l_i \neq l_j, K_k^{(s,d)}=1, w \in W, (s,d) \in CR, k \in K,$$

wherein $B_{sd}$ represents a bandwidth requirement of the service, $X_k^{(s,d)}$ represents a set of link occupation status of a service request (s, d) on a $k^{th}$ shortest path and represents a variable, and if the service request (s, d) occupies a spectrum slot w on a link $l_i$ ($l_j$) in the $k^{th}$ shortest path, a value of the variable is an amount of occupied bandwidth resources, or otherwise the value is 0.

8. The optimization method for minimizing network energy consumption based on traffic grooming according to claim 1, wherein the optical regenerator quantity constraint is:

$$Z_i < M \ \forall i \in N; \sum_{j=1}^{|N|} x_{k,s,j}^{(s,d)} - \sum_{j=1}^{|N|} x_{k,j,s}^{(s,d)} = K_k^{(s,d)} \ \forall (s,d) \in CR, k \in K;$$

$$\sum_{j=1}^{|N|} x_{k,j,d}^{(s,d)} - \sum_{j=1}^{|N|} x_{k,d,j}^{(s,d)} = K_k^{(s,d)} \ \forall (s,d) \in CR, k \in K;$$

$$\sum_{i=1}^{|N|} x_{k,j,d}^{(s,d)} = \sum_{i=1}^{|N|} x_{k,d,j}^{(s,d)} = K_k^{(s,d)} \ \forall (s,d) \in CR, k \in K, j \in K, j \neq s, d;$$

$$x_{k,i,j}^{(s,d)} \leq r_{k,i,j}^{(s,d)} \ \forall (s,d) \in CR, k \in K, i \in N, j \in N;$$

$$y_{k,i}^{(s,d)} \geq x_{k,i,j}^{(s,d)} \ \forall (s,d) \in CR, k \in K, i \in N, i \neq s, j \in N;$$

$$Z_i \geq \frac{\sum_{(s,d) \in CR} \sum_{k \in K} y_{k,i}^{(s,d)} \times B_{sd}}{VL} \ \forall i \in N,$$

wherein $Z_i$ represents a total quantity of configured optical regenerators on a node i; values of M and VL respectively represent a relatively large integer and a maximum bandwidth requirement that an optical regenerator is allowed to carry; $x_{k,i,j}^{(s,d)}$ is a binary variable, and if a service request (s, d) occupies a reachable path (i, j) on a $k^{th}$ shortest path, a value of the variable is 1, or otherwise the value is 0; $y_{k,i}^{(s,d)}$ is a binary variable, and if the service request (s, d) arranges an optical regenerator on a node i of the $k^{th}$ shortest path, a value of the variable is 1, or otherwise the value is 0; and $B_{sd}$ represents a bandwidth requirement of the service.

9. The optimization method for minimizing network energy consumption based on traffic grooming according to claim 1, wherein the service request is successfully established, and corresponding spectrum resources are allocated to the service request.

10. An optimization system for minimizing network energy consumption based on traffic grooming, comprising:
    a calculation module, configured to generate a group of service request sets in an elastic optical network, and calculate a reachable node set in a plurality of shortest paths according to a source node and a destination node of each service request;

an establishment module, configured to establish a virtual reachable path between a source node and a destination node in the reachable node set in the plurality of shortest paths; and a determination module, configured to: establish a target function of an integer linear programming model of the minimizing network energy consumption based on the virtual reachable path, and sequentially determine whether a bandwidth capacity constraint of a single spectrum slot, a path uniqueness constraint, a spectrum allocation constraint, and an optical regenerator quantity constraint are satisfied in a process of allocating a resource to each service request, wherein if all the constraints are satisfied, the service request is successfully established, or if any of the constraints is not satisfied, the service request fails to be established.

* * * * *